(12) United States Patent
Mentzel et al.

(10) Patent No.: US 10,144,163 B1
(45) Date of Patent: Dec. 4, 2018

(54) CONNECTOR AND METHOD FOR PRODUCING A CONNECTOR

(71) Applicant: PROTECH GmbH, Pfullingen (DE)

(72) Inventors: Juergen Mentzel, Pfullingen (DE); Benjamin Rudin, Pfullingen (DE)

(73) Assignee: PROTECH GmbH, Pfullingen (DE)

( * ) Notice: Subject to any disclaimer, the term of this patent is extended or adjusted under 35 U.S.C. 154(b) by 0 days.

(21) Appl. No.: 16/054,161

(22) Filed: Aug. 3, 2018

Related U.S. Application Data

(63) Continuation of application No. 15/441,852, filed on Feb. 24, 2017, now Pat. No. 10,065,349.

(30) Foreign Application Priority Data

Feb. 24, 2015 (EP) .................................... 16157213

(51) Int. Cl.
   *H01R 13/405* (2006.01)
   *B29C 45/16* (2006.01)
   (Continued)

(52) U.S. Cl.
   CPC ...... *B29C 45/1671* (2013.01); *B29C 45/1657* (2013.01); *B29C 45/1676* (2013.01); *B29C 71/02* (2013.01); *H01R 13/405* (2013.01); *H01R 43/005* (2013.01); *H01R 43/24* (2013.01); *B29C 45/14639* (2013.01); *B29C 2045/1678* (2013.01); *B29C 2071/027* (2013.01); *B29K 2063/00* (2013.01); *B29K 2067/006* (2013.01);
   (Continued)

(58) Field of Classification Search
   None
   See application file for complete search history.

(56) References Cited

U.S. PATENT DOCUMENTS

| 1,601,255 A | 9/1926 | Marra |
|---|---|---|
| 4,398,785 A | 8/1983 | Hedrick |

(Continued)

FOREIGN PATENT DOCUMENTS

| DE | 10041812 A1 | 3/2001 |
|---|---|---|
| EP | 183553 A2 | 6/1986 |
| WO | WO 86/03628 | 6/1986 |

OTHER PUBLICATIONS

Office Action for U.S. Appl. No. 15/441,852, dated May 8, 2018.
Notice of Allowance for U.S. Appl. No. 15/441,852, dated Jul. 25, 2018.

*Primary Examiner* — Tho D Ta
(74) *Attorney, Agent, or Firm* — Jason H. Vick; Sheridan Ross, PC

(57) ABSTRACT

An aspect of the invention is directed to a method for producing a connector using injection-molding by providing at least one conductor and at least one contact pin which are electrically connected at a contact point, producing a thermoset premold from a thermoset using injection-molding, wherein the thermoset is injection-molded around at least a first section of the at least one conductor and/or around at least a second section of the at least one contact pin, and injection-molding of a thermoplast on the thermoset premold, wherein the step of injection-molding takes place before the thermoset premold has obtained a degree of curing of 90%. Another aspect of the invention is a connector comprising at least one conductor and at least one contact pin is disclosed.

20 Claims, 2 Drawing Sheets

(51) Int. Cl.
*H01R 43/00* (2006.01)
*B29C 71/02* (2006.01)
*H01R 43/24* (2006.01)
*H01R 13/52* (2006.01)
*B29K 105/24* (2006.01)
*B29K 105/16* (2006.01)
*B29C 45/14* (2006.01)
*B29L 31/26* (2006.01)
*B29K 77/00* (2006.01)
*B29K 63/00* (2006.01)
*B29K 67/00* (2006.01)
*B29L 31/36* (2006.01)

(52) U.S. Cl.
CPC ...... *B29K 2077/00* (2013.01); *B29K 2105/16* (2013.01); *B29K 2105/243* (2013.01); *B29K 2995/0005* (2013.01); *B29L 2031/26* (2013.01); *B29L 2031/36* (2013.01); *H01R 13/521* (2013.01)

(56) References Cited

U.S. PATENT DOCUMENTS

| | | |
|---|---|---|
| 5,902,276 A | 5/1999 | Namey, Jr. |
| 5,984,724 A | 11/1999 | McNeel |
| 7,070,460 B1 | 7/2006 | Nagano |
| 7,614,911 B2 | 11/2009 | Hsieh et al. |
| 7,731,531 B2 | 6/2010 | Tsujino |
| 8,734,178 B2 | 5/2014 | Inagaki et al. |
| 9,397,440 B2 | 7/2016 | Mori et al. |
| 2003/0066504 A1 | 4/2003 | Kuhlen |
| 2008/0102235 A1 | 5/2008 | Skigen et al. |
| 2012/0040571 A1 | 2/2012 | Yoshioka et al. |
| 2014/0106625 A1 | 4/2014 | Kato et al. |
| 2015/0158221 A1 | 6/2015 | Izumi et al. |
| 2016/0036155 A1 | 2/2016 | Kataoka et al. |
| 2017/0239862 A1* | 8/2017 | Mentzel ............ B29C 45/1671 |

* cited by examiner

CONNECTOR AND METHOD FOR PRODUCING A CONNECTOR

CROSS REFERENCES TO RELATED APPLICATIONS

This applications is a Continuation of U.S. patent application Ser. No. 15/441,852, filed Feb. 24, 2017, now U.S. Pat. No. 10,065,349, which claims priority under 35 U.S.C. § 119 to European patent application EP 16 157 213.6, filed on Feb. 24, 2016. The entire contents of each are incorporated herein by reference in their entirety.

BACKGROUND

The present disclosure relates to a method of producing a connector having at least one conductor and at least one contact pin which are electrically connected at a contact point, and a corresponding connector.

Connectors are used today in all technological areas. They connect different electrical components in a simple manner even after assembly. Further, many connectors are removable, so that an existing connection can be separated easily, for example during maintenance or repair.

A connector comprises an electrical connection around which a thermoplast is injection-molded. During use the connector is subject to environmental conditions, for example humidity or liquids. While the connector side can usually be well sealed, e.g. using radial sealing rings, humidity and liquids can enter, e.g. along the insulating sheath of the conductor or even within the conductor. Since these interspaces are very small, the entering of humidity and liquids may be accelerated by capillary action. Therefore, humidity or liquids can slowly advance through the connector and can potentially reach the connector side and thus the electrical contacts of connected electrical components can thereby be damaged, e.g. due to a short. In particular, the tight sealing of conductors with multiple wires—in contrast to a single solid wire—poses a significant challenge.

In general, a thermoset can be used instead of a thermoplast, which may render a better material connection to the electrical element. However, a thermoset material is very hard and stiff after curing and does not provide any flexible elements, for example a spring hook. Therefore, such solution is suitable only for very few applications.

SUMMARY

It is an object of the present disclosure to provide an improved method for producing a connector and a corresponding resulting connector. In particular, it is desired to achieve the effect that humidity or liquids entering the connector are stopped at least when trying to propagate to the connector side. It is therefore intended to mitigate or reduce the problem that humidity or liquids advance within the connector and reach the contacts of a connected electrical component, thereby potentially damaging it, e.g., due to immediate shorts or due to slow corrosive impact.

The object is achieved by a method for producing a connector using injection-molding, the method comprising the steps: providing at least one conductor and at least one contact pin which are electrically connected at a contact point, producing a thermoset premold from a thermoset using injection-molding, wherein the thermoset is injection-molded around at least a first section of the conductor and/or around at least a second section of the contact pin, and injection-molding of a thermoplast on the thermoset premold, wherein the step of injection-molding takes place before the thermoset premold has obtained a degree of curing of about 90%.

One aspect to be noted is that the conductor and the contact pin receive a thermoset via injection-molding, so that the resulting thermoset premold encloses at least a first section of the connector and/or at least a second section of the contact pin, in particular enclosing a section of the conductor and a section of the contact pin including the contact point. Prior to the thermoset premold reaching a degree of curing of about 90% a thermoplast is injection-molded onto the thermoset premold. This early injection-molding provides a good adhesion or attachment between the thermoset and the thermoplast. The resulting thermoplast shape on the thermoset premold can be considered as a thermoplast overmold or a thermoplast aftermold.

The expression "degree of curing" is known to the skilled person in the field of material science, in particular in the field of producing electrical connectors via injection-molding. However, in particular, the expression is to be understood in the sense of a chemical cross-linking or a chemical cross-linking of molecules. The expression "degree of curing" can also be understood as the degree of polymer cross-linking by applying thermal energy. The cross-linking may in particular be understood as a chaining or concatenation of simple molecules to complex three dimensional macro molecule chains.

Concerning the technical background regarding the expression "degree of curing" reference is made to the standard literature, for example "Die Kunststoffe—Chemie, Physik, Technologie—Kunststoff-Handbuch Band 1—", Becker, G. W., Braun, D., Carl Hanser Verlag, 1990, "Duroplaste—Aushartung—Prüfung—Eigenschaften", Ehrenstein, G. W., Bittmann, E., Carl Hanser Verlag, 1997, "Kunststoffprügung", Grellmann, W., Seidler, S., 2. Auflage, Carl Hanser Verlag, 2011 and "Praxis der Thermischen Analyse von Kunststoffen", Ehrenstein G. W., Riedel G., Trawiel P., 2. Auflage, Carl Hanser Verlag, 2003. These documents are incorporated herein by reference in their entirety.

The skilled person is aware that thermoplast and thermoset materials have fundamentally different properties, even if some related expressions are inapplicably used for both materials. For example, the expression of "cross-linking" is best used in the context of thermoset materials, but it can also be found in the context thermoplast materials. However, even if the same expression "cross-linking" is used for both materials, the skilled person knows that "cross-linking" of thermoplasts is weak or non-existent, while "cross-linking" for thermosets means that long molecule chains, e.g. polymer chains, are building connections among each other forming a two- or even three-dimensional web. Even for those thermoplasts where a weak cross-linking takes place, e.g. elastomers, the skilled person understands that the cross-linking for elastomers is much more lose and simple leaving wide-meshed structures, while the cross-linking for thermosets is very complex, often in all three dimensions, resulting in a close-meshed structure. A term like "hardening" is correctly used in the context of thermoplasts and refers to the material cooling down and becoming more solid. The term "hardening" is not understood by the skilled person in the sense of a thermoset changing its chemical properties due to the process of the molecule chains building tight connections. While thermoplasts cool down without any or only minimal chemical changes, i.e. weak cross-linking if any at all, thermosets change their chemical structure and become strongly cross-linked. The term "weakly cross-linked" is sometimes also referred to as "lightly cross-linked" or "intermediate cross-link density", while the term "strongly cross-linked" is sometimes also referred to as "heavily cross-linked" or "very high cross-link density". These latter technical terms or definitions in macromolecular polymer discussions are usually applied to thermosets only such as epoxy resin or others.

The degree of curing of a material can be determined by taking the material to be analyzed and determining the remaining enthalpy of reaction (RE), indicating the enthalpy of reaction which can still be set free. Further, the total enthalpy of reaction (TE) of a fresh material, in particular a resin compound, is determined. The ratio of remaining enthalpy of reaction and total enthalpy of reaction is subtracted from one, i.e., degree of curing=1−RE/TE.

The inventors found that a surprisingly good cross-linking between the thermoset premold and the thermoplast can be achieved when applying the thermoplast via injection-molding before, in particular well before, the thermoset has cured. The disclosure is applicable to male contact pins as well as female contact pins having openings.

In a preferred refinement, the thermoset premold can be produced in a first injection-molding tool and the thermoplast can be injection-molded around the thermoset premold in a second injection-molding tool, wherein the thermoset premold can be removed from the first injection-molding tool.

This process allows for an effective production.

The thermoplastic can be injected after the thermoset has reached a degree of cure between about 40% and about 99%. In some embodiments, the thermoplastic can be injected after the thermoset has reached a degree of cure between about 64% and about 90%. In a preferred refinement the step of injection-molding the thermoplast can be performed before the thermoset premold has reached a degree of curing of about 80%, preferably about 70%, more preferably about 67% and in particular about 64%.

Unexpectedly, this refinement allows for a good adhesion or attachment between the thermoset and the thermoplast.

In a further exemplary refinement the step of injection-molding the thermoplast can be performed after the thermoset premold has reached a degree of curing of about 40%, preferably about 50%, more preferably about 55% and in particular about 57%.

The inventors found, according to one aspect of the disclosure, that the bonding between the thermoset and the thermoplast seems to be the better the lower the degree of curing is before the step of injection-molding. At the same time, a boundary condition of the manufacturing process was detected in that the thermoset premold must have a sufficient form stability or shape stability, before the transfer to the injection-molding step can be performed, in particular so that the thermoset premold can be removed from the first injection-molding tool without being damaged. The given values provide a starting point for a weighting between having a sufficient form stability without the curing having progressed too far.

In a refinement the step of injection-molding of the thermoplast can be performed after the thermoset premold has reached a degree of curing of about 57.5%, but before the thermoset premold has reached a degree of curing of about 63.5%.

Applicant believes that this refinement can be able to provide, for certain exemplary embodiments, advantages for a typical connector which is used in the automotive industry.

In a further refinement the step of injection-molding of the thermoplast can be performed while the thermoset premold has at least about 50%, preferably at least about 60%, more preferably at least about 70% and in particular more than about 75% of its thermal energy which was present right after the step of producing.

This refinement can allow for a good bonding between the thermoset and the thermoplast. In order to implement this feature, or even without implementing this feature, Applicant believes that, according to an exemplary embodiment, a cooling of the thermoset premold is avoided as much as this is practical from a process perspective. In particular for some exemplary embodiments a cooling phase can be avoided, in particular an active cooling phase involving a cooling medium can be avoided.

In a further refinement the step of injection-molding of the thermoset is performed when the thermoset premold has not more than about 99%, preferably not more than about 95%, more preferably not more than about 90% and in particular not more than about 85% of its thermal energy which was present right after the step of producing.

This refinement can, according to an exemplary embodiment, be advantageous in view of the following injection-molding using the thermoplast. This can be the case, because the production of the thermoset premold can require, in some embodiments, a temperature between about 160° C. and about 190° C., whereas the injection-molding using the thermoplast takes place at a temperature between about 75° C. and about 100° C. This temperature of the thermoset while the thermoplast is injected molded, can provide a manner to allow for good adhesion between the thermoset and the thermoplast.

In a further refinement the step of injection-molding of the thermoplast can take place while the thermoset premold has a temperature of at least about 100° C., preferably at least about 125° C., more preferably at least about 150° C. and in particular at least about 160° C.

This refinement can be able to allow for a good bonding between the thermoset and the thermoplast and can be achieved, as explained above, by avoiding a cooling phase.

In a further refinement the step of injection-molding of the thermoplast takes place while the thermoset premold has a temperature of not more than about 250° C., preferably not more than about 225° C., more preferably not more than about 200° C. and in particular not more than about 190° C.

This refinement is believed, for some exemplary embodiments, to be advantageous from a production perspective.

In a further refinement the step of producing the thermoset premold can last at least about 8 seconds, preferably at least about 9 seconds, more preferably at least about 10 seconds and in particular at least about 11 seconds.

This refinement is believed, for some exemplary embodiments, to be advantageous in view of the desired form stability.

In a further refinement the step of production of the thermoset premold can last not more than about 20 seconds, preferably not more than about 18 seconds, more preferably not more than about 16 seconds, and in particular not more than about 14 seconds.

In a further refinement the time between the end of the step of producing of the thermoset premold and the start of the step of injection-molding the thermoplast cannot exceed about 30 seconds, preferably not more than about 20 seconds, more preferably not more than about 15 seconds and in particular not more than about 10 seconds.

This refinement takes into account that the curing of the thermoset premold progresses even after the thermoset premold has been removed from the first injection-molding tool. The reason is that the thermoset premold still has a significant amount of thermal energy even after the removal which advances the curing and thus the process of creating cross-links as explained above. This refinement can avoid that despite an early removal of the thermoset premold from the first injection-molding tool the curing continues as time passes by and reaches a degree of curing that does not allow for a good bonding between the thermoset and the thermoplast anymore.

In a further refinement a material of the thermoset can be an epoxy resin, in particular an epoxy resin molding material for injection-molding.

This refinement can be able to render good results for certain exemplary embodiments.

In a further refinement a material of the thermoplast can be a filled polyamide 66 (PA66) or polybutylene terephthalate (PBT) material and can be selected in particular from the group comprising PA66 Glass filled (GF)35, PBT GF30, and similar materials.

This refinement can be able to render good results for certain exemplary embodiments.

In a further refinement the step of injection-molding of the thermoplast can be followed by a step of tempering or malleablizing.

This refinement can allow for an improved bonding between the thermoset and the thermoplast for particular combinations of materials. This step can also be understood as a post-curing.

According to a second aspect, there is provided a connector comprising at least one conductor and at least one contact pin which are electrically connected to one another at a contact point, wherein at least a first section of the at least one conductor and/or at least a second section of the at least one contact pin is surrounded by a thermoset applied via injection-molding, wherein a thermoplast is injection-molded onto the thermoset.

Such connector can provide that humidity or liquids can be hindered to advance within the connector to the connector side. Further, due to the injection-molding using the thermoplast flexible elements can be provided. A good adhesion or attachment between the thermoset and the thermoplast and the resulting sealing can be obtained using the process described above.

In a further refinement the degree of curing of the thermoset is less than about 95%, preferably less than about 90%, more preferably less than about 85% and in particular less than about 80%.

In this refinement the difference between the maximum degree of curing, i.e. close to or substantially about 100%, is present, since the full curing of the thermoset is not being waited for, but the injection-molding using the thermoplast is performed rather early.

In a further preferred embodiment a first degree of curing of the thermoset at a joint face—also called (phase) surface or boundary (surface)—between the thermoset and the thermoplast is at least substantially the same as a second degree of curing of the thermoset at a location which is at a distance from the joint face, in particular at a maximum distance from the joint face.

Having a substantially similar degree of curing of the thermoset at different locations of the thermoset premold can be achieved, as explained above, by avoiding a cooling phase, in particular an active cooling phase.

In a further preferred refinement the conductor comprises a plurality of wires, i.e., comprising a plurality of individual wires, wherein the conductor is in particular a stranded wire.

It is understood that the features explained above and the features explained in the following can be used in different combinations or in isolation, only the claims defining the scope of protection.

BRIEF DESCRIPTION OF THE DRAWINGS

Exemplary embodiments are shown in the drawings and will be further explained in the following. The figures show.

DESCRIPTION OF EXEMPLARY EMBODIMENTS

Figure 1:
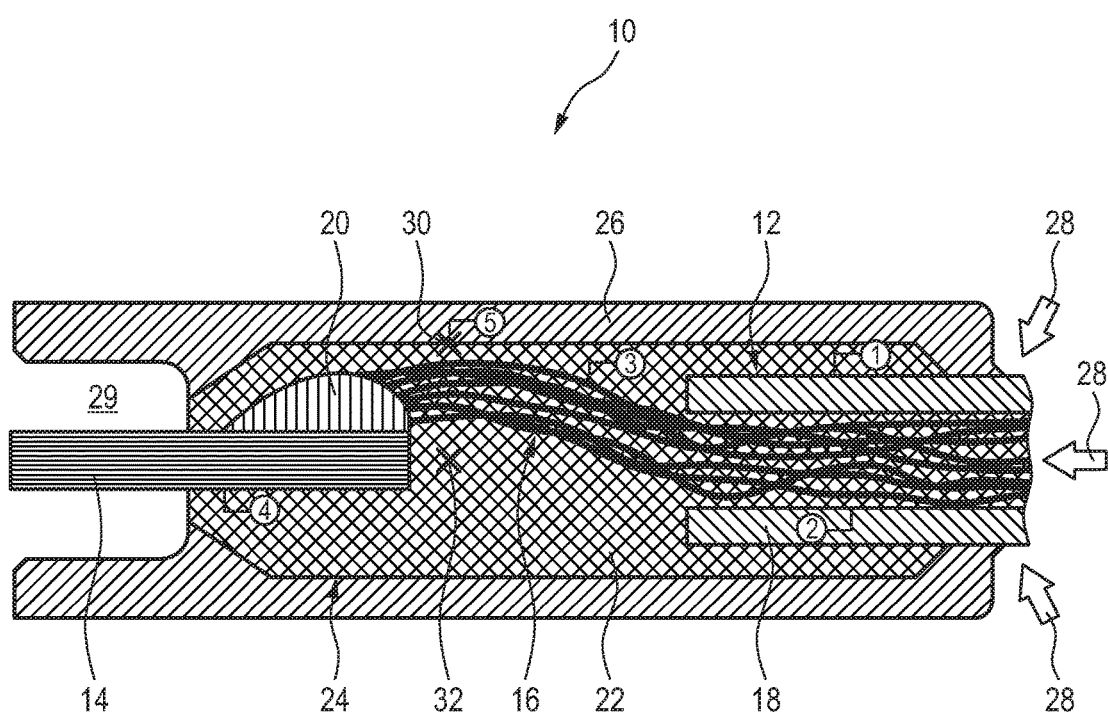
FIG. 1 is an embodiment of a connector.

FIG. 1 illustrates an embodiment of a connector 10 having a conductor 12 and a contact pin 14. The conductor 12 comprises a plurality of single wires 16 which extend from the non-conducting conductor sheath 18 within the connector 10. The side of the connector 10 exposing the contact pin 14 for connection to another electrical component is called connector side 29. In exemplary embodiments, a connector will have multiple contact pins each with a corresponding conductor.

The conductor 12 is electrically connected to the contact pin 14 at a contact point 20. The contact point 20 is provided as a soldering point or welding point. Other preferred embodiments can use a crimp-connection. The contact point 20 can also be obtained in other ways.

A first section of the conductor 12 and a second section of the contact pin 14 are embedded in a thermoset 22 via injection-molding. In this preferred embodiment all exposed single wires 16, a section of the single wires 16 within the conductor sheath 18, a section of the conductor sheath 18 and the contact point 20 are also surrounded by thermoset. The shape of the thermoset which results from injection-molding the thermoset around a section of the at least one conductor 12 and/or the section of the at least one contact pin 14 is called thermoset premold 24.

It is further noted that thermoset premold 24 can comprise a plurality of separate individual parts. Also, there are embodiments where the thermoset premold 24 does not surround the contact pin 14, the contact point 20 nor the exposed sections of the single wires 16. However, it is believed to be advantageous, for certain exemplary embodiments, from a process perspective, if the thermoset is injection-molded around the multiple elements as shown.

The thermoset 22 or the thermoset premold 24 receives a thermoplast 26 cover via injection-molding. While the thermoset 22 is very hard and stiff without any flexible properties when the production of the connector 10 is finished, the thermoplast 26 allows to provide flexible elements, for example a spring hook (not shown).

FIG. 1 illustrates five different joint faces between the different materials which are indicated with reference numerals 1 to 5. The joint faces are present between the following elements: 1) outside of conductor sheath 18 and thermoset 22, 2) inside of conductor sheath 18 and thermoset 22, 3) single wires 16 and thermoset 22, 4) contact pin 14 and thermoset 22, and 5) thermoset 22 and thermoplast 26.

The joint faces 1 and 2 will typically not provide a good sealing, since neither the neither thermoset 22 nor the thermoplast 26 have a fully tight bonding to the conductor sheath 18. However, a good sealing is provided at the joint face 3, since the thermoset 22 has a low viscosity during injection-molding and also has good adhesion or attachment characteristics on metal. In addition, the thermoset 22 can also be pulled into very small cavities due to capillary action.

At the joint face 4 a good sealing is given, because the thermoset 22 has good adhesion or attachment characteristics on metal. A good bonding between the thermoset 22 and the thermoplast 26 is present at joint face 5, because the thermoplast 26 is applied to the thermoset premold 24 before the thermoset premold 24 is fully cured. Furthermore, a degree of curing of the thermoset at a joint face between the thermoset and the thermoplast is at least substantially equal to the degree of curing of the thermoset at a location which is internal to the thermoset. The internal location of the thermoset can be at a distance from the joint face, that can depend on the configuration of the connector.

Therefore, there is substantially no possibility for humidity or liquids, indicated with big arrows 28, to enter the connector 10, advance within the connector 10 and reach the connector side 29. Therefore, electric components which are electrically connected to the connector 10 are protected, even if the connector 10 is subjected to environmental conditions.

For the shown embodiment of the connector 10 a first degree of curing of the thermoset 22 at the joint face 10, an exemplary location is indicated with reference numeral 30, between the thermoset 22 and the thermoplast 26 is at least substantially the same as a second degree of curing of the thermoset 22 at a location 32 which is at a distance from the joint face 5. Here, the location 32 is at a maximum distance from the joint face 5, because the joint face 5 surrounds the elements enclosed therein in the manner of a cylinder.

Figure 2:
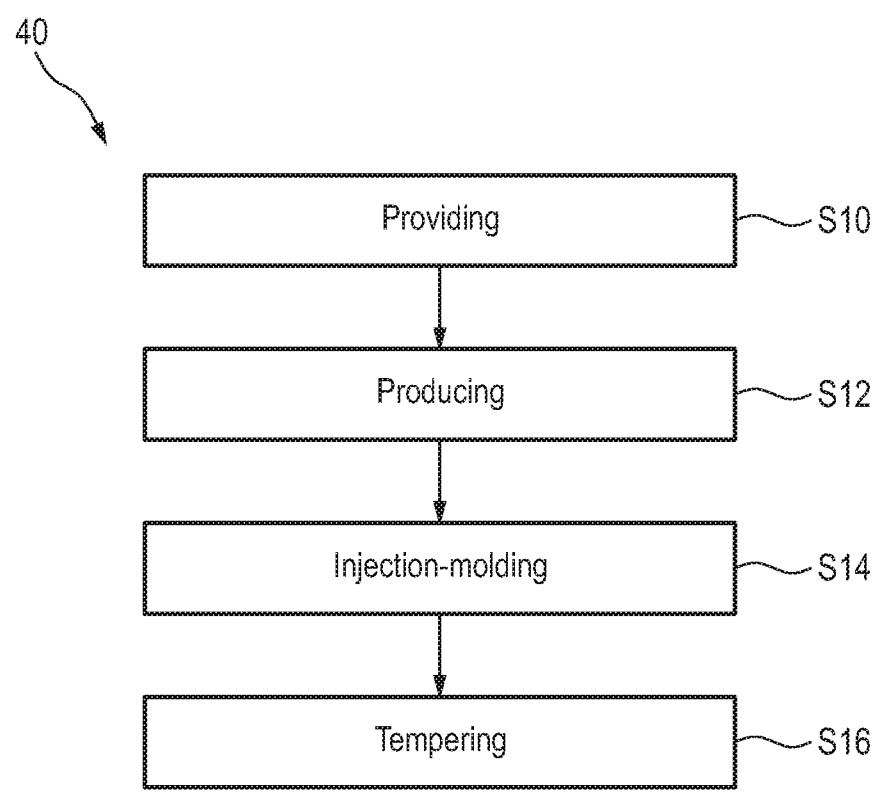
FIG. 2 is an embodiment of a method for producing a connector.

FIG. 2 illustrates a method for producing a connector 10 using injection-molding. The method starts with providing S10 at least one conductor 12 and at least one contact pin 14, which are electrically connected at a contact point 20. In a subsequent step S12 the thermoset premold 24 is produced from a thermoset 22 using injection-molding, wherein the thermoset 22 is applied around at least a first section of the at least one conductor 12 and/or at least a second section of the at least one contact pin 14.

A step of injection-molding S14 of a thermoplast 26 on the thermoset premold 24 follows. The step of injection-molding S14 takes place before the thermoset premold 24 has reached a degree of curing of 90%. Optionally, the step of injection-molding S14 can be followed by a step of annealing S16. Further preferred embodiments of the method 40 can be derived from the above explanations.

Ranges have been discussed and used within the forgoing description. One skilled in the art would understand that any sub-range within the stated range would be suitable, as would any number within the broad range, without deviating from the invention.

The foregoing description of the present invention has been presented for purposes of illustration and description. Furthermore, the description is not intended to limit the invention to the form disclosed herein. Consequently, variations and modifications commensurate with the above teachings, and the skill or knowledge of the relevant art, are within the scope of the present invention. The embodiment described hereinabove is further intended to explain the best mode known for practicing the invention and to enable others skilled in the art to utilize the invention in such, or other, embodiments and with various modifications required by the particular applications or uses of the present invention. It is intended that the appended claims be construed to include alternative embodiments to the extent permitted by the prior art.

What is claimed is:

1. A connector, comprising:
   at least one conductor;
   at least one contact pin, wherein the at least one conductor and the at least one contact pin are electrically connected at a contact point;
   a thermoset material, wherein at least one of a section of the at least one conductor and a section of the at least one contact pin is surrounded by the thermoset material applied via injection-molding; and
   a thermoplastic material, wherein the thermoplastic material is injection-molded onto the thermoset material;
   wherein a degree of curing of the thermoset material is less than about 95% when the thermoplastic material is injection molded.

2. The connector of claim 1, wherein a first amount of curing of the thermoset material at a joint face between the thermoset material and the thermoplastic material is at least substantially equal to a second amount of curing of the thermoset material at a location which is internal to the thermoset material.

3. The connector of claim 1, wherein the conductor comprises a plurality of wires.

4. The connector of claim 1, wherein the conductor is a stranded wire.

5. A connector comprising:
   at least one conductor;
   at least one contact pin, wherein the at least one conductor and the at least one contact pin are electrically connected at a contact point;
   a thermoset material, wherein at least one of a section of the at least one conductor and a section of the at least one contact pin is surrounded by the thermoset material applied via injection-molding;
   a thermoset premold, the thermoset premold produced from the thermoset material by injection molding; and
   a thermoplastic material, wherein the thermoplastic material is injection-molded onto the thermoset premold before the thermoset premold is 90% cured.

6. The connector of claim 5, wherein the thermoset premold is produced in a first injection-molding tool and the thermoplastic material is injection-molded around the thermoset premold in a second injection-molding tool, wherein the thermoset premold is removed from the first injection-molding tool.

7. The connector of claim 5, wherein the injection-molding of the thermoplastic material is performed before the thermoset premold is 80% cured.

8. The connector of claim 5, wherein the injection-molding of the thermoplastic material is performed after the thermoset premold is 40% cured.

9. The connector of claim 5, wherein the injection-molding of the thermoplastic material is performed after the thermoset premold is cured between 57.5% and 63.5%.

10. The connector of claim 5, wherein the thermoset material is an epoxy resin.

11. The connector of claim 5, wherein the thermoplastic material is selected from the group consisting of a filled PA66, a PBT, a PA66 GF35, and a PBT GF30.

12. The connector of claim 5, wherein the thermoplastic material is tempered or malleablized after injection-molding.

13. A connector comprising:
   a plurality of conductors;
   at least one contact pin, wherein the plurality of conductors and the at least one contact pin are electrically connected at a contact point;

an injection molded thermoset material, wherein at least a portion of the at least one conductor and a portion of the at least one contact pin are surrounded by the injection molded thermoset material;

a thermoset premold, the thermoset premold produced from the injection molded thermoset material; and a thermoplastic material, wherein the thermoplastic material is injection-molded onto the thermoset premold before the thermoset premold is 90% cured.

14. The connector of claim 13, wherein the connector is environmentally sealed.

15. The connector of claim 13, wherein the injection-molding of the thermoplastic material is performed before the thermoset premold is 80% cured.

16. The connector of claim 13, wherein the injection-molding of the thermoplastic material is performed after the thermoset premold is 40% cured.

17. The connector of claim 13, wherein the injection-molding of the thermoplastic material is performed after the thermoset premold is cured between 57.5% and 63.5%.

18. The connector of claim 13, wherein the thermoset material is an epoxy resin.

19. The connector of claim 13, wherein the thermoplastic material is selected from the group consisting of a filled PA66, a PBT, a PA66 GF35, and a PBT GF30.

20. The connector of claim 13, wherein the thermoplastic material is tempered or malleablized after injection-molding.

* * * * *

UNITED STATES PATENT AND TRADEMARK OFFICE
CERTIFICATE OF CORRECTION

PATENT NO. : 10,144,163 B1
APPLICATION NO. : 16/054161
DATED : December 4, 2018
INVENTOR(S) : Juergen Mentzel et al.

Page 1 of 1

It is certified that error appears in the above-identified patent and that said Letters Patent is hereby corrected as shown below:

On the Title Page

At item (30) "Foreign Application Priority Data", Column 1, Line 18 please delete "Feb. 24, 2015" and insert -- Feb. 24, 2016 --, therefore.

Signed and Sealed this
Twenty-sixth Day of February, 2019

Andrei Iancu
*Director of the United States Patent and Trademark Office*